United States Patent [19]

Schrimpf et al.

[11] Patent Number: 5,759,436
[45] Date of Patent: Jun. 2, 1998

[54] AIRCRAFT DEICING OR ANTIICING COMPOSITIONS

[75] Inventors: Hans Schrimpf, Mutterstadt; Klaus Pfitzner, Ludwigshafen, both of Germany

[73] Assignee: BASF Aktiengesellschaft, Ludwigshafen, Germany

[21] Appl. No.: 591,564

[22] PCT Filed: Jul. 28, 1994

[86] PCT No.: PCT/EP94/02489

§ 371 Date: Feb. 14, 1996

§ 102(e) Date: Feb. 14, 1996

[87] PCT Pub. No.: WO95/05428

PCT Pub. Date: Feb. 23, 1995

[30] Foreign Application Priority Data

Aug. 14, 1993 [DE] Germany .......... 43 27 360.2

[51] Int. Cl.[6] .................................................. C09K 3/18
[52] U.S. Cl. .................................. 252/70; 106/13
[58] Field of Search ........................ 252/70; 106/13

[56] References Cited

U.S. PATENT DOCUMENTS

| | | | |
|---|---|---|---|
| 3,362,909 | 1/1968 | Georgal et al. | 252/70 |
| 3,940,356 | 2/1976 | Byrnes | 106/13 |
| 4,283,297 | 8/1981 | Peters et al. | 106/13 |
| 4,585,571 | 4/1986 | Bloom | 106/13 |
| 4,744,913 | 5/1988 | Salvador et al. | 252/70 |
| 4,954,279 | 9/1990 | Ma et al. | 106/13 |
| 5,043,088 | 8/1991 | Falla | 252/70 |
| 5,118,435 | 6/1992 | Nieh | 252/70 |
| 5,268,116 | 12/1993 | Fusiak et al. | 106/13 |
| 5,334,323 | 8/1994 | Schrimpf et al. | 106/13 |
| 5,389,276 | 2/1995 | Coffey et al. | 252/70 |
| 5,461,100 | 10/1995 | Jenkins et al. | 252/70 |

FOREIGN PATENT DOCUMENTS

| | | | |
|---|---|---|---|
| 3832310 | 4/1990 | Germany . | |
| 94/05741 | 3/1994 | WIPO | 252/70 |

OTHER PUBLICATIONS

Chemical Abstract No. 117:132972 which is an abstract of European Patent Specification No. 487,190 (May 1992).
Chemical Abstract No. 126:344570 which is an abstract of European Patent Specification No. 769,541 (Apr. 1997).

*Primary Examiner*—Anthony Green
*Attorney, Agent, or Firm*—Oblon, Spivak, McClelland, Maier & Neustadt, P.C.

[57] ABSTRACT

Aircraft deicing or antiicing compositions based on glycols and water consist essentially of:

a) from 80 to 92% by weight of alkylene glycol having 2 or 3 carbon atoms, an oxyalkylene glycol having 4 to 6 carbon atoms, or mixtures thereof, b) from 0.05 to 1.0% by weight of at least one nonionic surfactant comprising alcohols having 10 to 20 carbon atoms alkoxylated with from 1 to 10 equivalents of ethylene oxide, propylene oxide or mixtures thereof, c) from 0.1 to 0.8% by weight of polymeric carboxylic acid having a molecular weight of from 1,000 to 10,000, d) from 0 to 1.5% by weight of ammonia or of a hydroxyalkylamine, e) from 0 to 1.5% by weight of a further surfactant, f) from 0.01 to 0.8% by weight of at least one corrosion inhibitor, and g) water as remainder.

8 Claims, No Drawings

AIRCRAFT DEICING OR ANTIICING COMPOSITIONS

The present invention concerns aircraft deicing or antiicing compositions based on glycols and water.

Aircraft deicing compositions are applied to aircraft in wintery weather before takeoff to deice them or to prevent ice forming on them for a certain period (the so-called hold-over time). This goal is frequently achieved with compositions which in addition to a glycol and water contain thickeners which increase the viscosity of the fluid and thus prevent rapid runoff of the fluid off the aircraft. The thickeners are for example cross-linked, high molecular weight polyacrylic acids. The composition of such thickener-containing deicing fluids is known for example from DE-A-3 832 310. Such fluids can give long hold-over times.

At airports there is increased interest these days in recycling deicing fluids. One approach is to separate in particular the glycol component from the used fluid by distillation and use it for dissolving further deicer components.

However, such a method is not economical for thickener-containing fluids, since the thickeners, in their effect, react extremely sensitively to small changes in the compositions of the deicing fluids and therefore necessitate very careful blending of such fluids using recovered glycol.

The ISO standard 11075 describes the technical requirements of unthickened aircraft deicing fluids having a glycol content of above 80% by weight, which in use are diluted to a water content from 25 to 50% by weight. The disadvantage of such fluids as conform for example to U.S. Airforce specification MIL A-8243 D is their short hold-over time, which in practice frequently necessitates repeated deicing of an aircraft when takeoff is delayed by a few minutes. On the other hand, working up such deicing fluids and reusing the glycol component is technically relatively straight forward.

It is an object of the present invention to provide thickener-free deicing or antiicing compositions which have long hold-over times. More particularly, the object is to find compositions which distinctly exceed the 3 minute minimum hold-over time of ISO11075.

We have found that this object is achieved by thickener-free aircraft deicing or antiicing compositions based on glycols and water consisting essentially of:

a) from 80 to 92% by weight of alkylene glycol having 2 or 3 carbon atoms, an oxyalkylene glycol having 4 to 6 carbon atoms, or mixtures thereof, b) from 0.05 to 1.0% by weight of at least one nonionic surfactant comprising alcohols having 10 to 20 carbon atoms alkoxylated with from 1 to 10 equivalents of ethylene oxide, propylene oxide or mixtures thereof, c) from 0.1 to 0.8% by weight of polymeric carboxylic acid having a molecular weight of from 1,000 to 10,000, d) from 0 to 1.5% by weight of ammonia or of a hydroxyalkylamine, e) from 0 to 1.5% by weight of a further surfactant, f) from 0.01 to 0.8% by weight of at least one corrosion inhibitor, and g) water as remainder.

The weight percentages are always based on the total weight of the composition, the amount of water always being used to make up to 100%.

Specifically the following components are used in the compositions of the invention:

a) This component is preferably propylene glycol or diethylene glycol. Component a) is preferably used in amounts from 85 to 90% by weight.

b) This surfactant component preferably comprises $C_{13}-C_{15}$ oxo alcohols which have been alkoxylated with from 1 to 10 equivalents of ethylene oxide, preferably with 3 to 5 molecules. However, it is also possible to use surfactants based on lauryl alcohol, myristyl alcohol, palmityl alcohol and stearyl alcohol and also tallow fat alcohols. It is also possible to use mixtures of the surfactants mentioned. The surfactants are commercially obtainable or preparable by known methods, for example by reacting the alcohols mentioned with from 1 to 10 equivalents of ethylene oxide or propylene oxide. The preferred amount of surfactant is from 0.1 to 0.5% by weight.

c) The polymeric carboxylic acid is preferably a polyacrylate which may contain up to 15% by weight, based on the polymer, of comonomers such as maleic anhydride and itaconic acid. The preferred amount of this polymer is from 0.2 to 0.5% by weight.

d) Ammonia and hydroxyalkylamines such as monoethanolamine, diethanolamine and triethanolamide are preferably used in the compositions of the invention in amounts from 0.1 to 0.5% by weight.

e) Preferably the compositions of the invention contain a surfactant different from component b) in amounts from 0.05 to 1.0% by weight, particularly preferably from 0.1 to 0.4% by weight. Especially if alcohols having fewer than 6 oxyalkylene groups are used as component b), it is advantageous to include a further surfactant in the compositions.

Suitable surfactants are anionic surfactants such as alkali metal salts of alkylarylsulfonates, e.g. sodium dodecylbenzenesulfonate, and fatty alcohol (ether) sulfates, but also cationic surfactants. A typical anionic surfactant also includes $C_{12}-C_{14}$ fatty alcohol (lauryl alcohol) reacted with 2 mol of ethylene oxide and then sulfated and neutralized with sodium hydroxide solution.

Preference, however, is given to nonionic surfactants such as surfactants from $C_{13}-C_{15}$ alcohols which have been alkoxylated with from 11 to 20 molecules of ethylene oxide, also fatty acid amides and zwitterionic compounds such as glycine derivatives. Particular preference is given to N-methyl-N-oleoylglycine (also known as N-oleoylsarcosine or Medialan acid).

f) Component f) comprises corrosion inhibitors of the type customary for fluids based on a glycol and water. Examples include sodium nitrate, the potassium or sodium salt of sebacic acid, benzotriazole and tolutriazole.

g) This component is preferably fully demineralized water.

The deicing compositions are prepared by mixing the components in a stirred vessel in any desired order. It is advantageous to introduce the components b) to f) into the glycol a) and then to add the water g).

The unthickened deicing compositions of the invention give long hold-over times which are distinctly longer than the minimum time of 3 minutes required of such mixtures by the ISO standard. Lengthening the hold-over time increases the safety reserves in those cases in which there has been a short delay in the takeoff of the aircraft. Moreover, the compositions of the invention have a low surface tension, reducing the loss of lift during takeoff.

EXAMPLES

Example 1

Components a) 89.0% by weight of diethylene glycol b) 0.3% by weight of a $C_{13}$–$C_{15}$ oxo alcohol alkoxylated with 3 equivalents of ethylene oxide c) 0.35% by weight of polyacrylic acid molecular weight about 4000 d) 0.50% by weight of triethanolamine e) 0.20% by weight of N-methyl-N-oleoylglycine f) 0.05% by weight of benzotriazole g) 9.6% by weight of water The components b)–f) were added to a) and admixed with g) by stirring.

Example 2

Components a) 89.0% by weight of 1,2-propylene glycol b) 0.4% by weight of a $C_{13}$–$C_{15}$ oxo alcohol alkoxylated with 5 equivalents of ethylene oxide c) 0.40% by weight of polyacrylic acid molecular weight about 4000 d) 0.25% by weight of diethanolamine e) 0.20% by weight of N-methyl-N-oleoylglycine f) 0.05% by weight of benzotriazole g) 9.7% by weight of water Example 3 a) 89.00% by weight of 1,2-propylene glycol b) 0.15% by weight of a $C_{12}$–$C_{14}$ fatty alcohol (lauryl alcohol) ethoxylated with 2 mol of ethylene oxide, sulfated and neutralized with sodium hydroxide solution c) 0.30% by weight of a $C_{13}$–$C_{15}$ oxo alcohol ethoxylated with 3–5 molecules of ethylene oxide d) 0.40% by weight of a polymeric carboxylic acid having a molecular weight of about 4000, neutralized with NaOH e) 0.05% by weight of benzotriazole f) 0.20% by weight of triethanolamine g) remaining % by weight of water a) 82.00% by weight of 1,2-propylene glycol b) 0.30% by weight of a $C_{12}$–$C_4$ oxo alcohol ethoxylated with 8 molecules of ethylene oxide c) 0.01% by weight N-oleoyl sarcosine d) 0.05% by weight of benzotriazole e) 0.07% by weight of sodium silicate f) 0.40% by weight of a polymeric carboxylic acid having a molecular weight of about 4000, neutralized with NaOH g) remaining % by weight of water Comparative Example 1

Components a) 89.0% by weight of 1,2-propylene glycol b') 0.05% by weight of sodium di(2-ethylhexylsulfosuccinate)

c') 0.09% by weight of dipotassium hydrogenphosphate d') 0.5% by weight of sodium tolutriazole e') 10.36% by weight of water This deicing fluid was prepared in accordance with the U.S. Airforce specification MIL A-82 43 D.

Comparative Example 2

Components a) 89.0% by weight of 1,2-propylene glycol b') 0.05% by weight of dodecylbenzenesulfonate c') 0.09% by weight of dipotassium hydrogenphosphate d') 10.86% by weight of water Comparative Example 3

Components a) 84.0% by weight of diethylene glycol 5.0% by weight of 1,2-propylene glycol b) - c) 0.35% by weight of polyacrylic acid, molecular weight about 4000 d) 0.35% by weight of triethanolamine e) 0.4% by weight of dodecylbenzenesulfonate f) 0.5% by weight of benzotriazole g) 9.85% by weight of water Prepared similarly to Example 1

All the compositions were tested as follows:

1. Determination of the hold-over time against refreezing by the water spray endurance test of ISO 11075, A 2.1., using deicing fluid diluted 50:50 with hard water as per ISO 11075

2. Surface tension as per ASTM D 1331

The following table shows the test results for the deicing fluids:

| Example | Hold-over time Water spray test (ISO 11075) [min] | Hold-over time High humidity test (ISO 11075) [min] | Surface tension at 23° C. (ASTM D [mN/m] |
|---|---|---|---|
| Example 1 | 10 | 60 | 29 |
| Example 2 | 9 | 80 | 29 |
| Example 3 | 6 | 80 | 32 |
| Example 4 | 6 | 60 | 32 |
| Comparative Example 1 | 3 | 20 | 33 |
| Comparative Example 2 | 3 | 10 | 34 |
| Comparative Example 3 | 5 | 22 | 33 |

The deicing or antiicing fluids of the invention give hold-over times which are distinctly longer than the hold-over times of the comparative examples. Furthermore, the surface tension of the compositions according to the invention is lower than that of the comparative compositions.

We claim:

1. Aircraft deicing or antiicing compositions consisting essentially of:

a) from 80 to 92% by weight of alkylene glycol having 2 or 3 carbon atoms, an oxyalkylene glycol having 4 to 6 carbon atoms, or mixtures thereof, b) from 0.05 to 1.0% by weight of at least one nonionic surfactant comprising alcohols having 10 to 20 carbon atoms alkoxylated with from 1 to 10 equivalents of ethylene oxide, proplyene oxide or mixtures thereof, c) from 0.1 to 0.8% by weight of polymeric carboxylic acid having a molecular weight of from 1,000 to 10,000, d) from 0 to 1.5% by weight of ammonia or of a hydroxy-alkylamine, e) from 0 to 1.5% by weight of a surfactant other than component b), which is selected from the group consisting of anionic surfactants, cationic surfactants and nonionic surfactants, f) from 0.01 to 0.8% by weight of at least one corrosion inhibitor suitable for deicing compositions, and g) water as remainder.

2. Compositions as claimed in claim 1 wherein component a) is propylene glycol or diethylene glycol.

3. Compositions as claimed in claim 1 wherein component b) is $C_{13}$–$C_{15}$ oxo alcohols.

4. Compositions as claimed in claim 1 wherein component e) is from 0.05 to 1.5% by weight of N-methyl-N-oleoylglycine.

5. The compositions as claimed in claim 1, wherein component e) is selected from the group consisting of alkali metal salts of alkyarylsulfonates, fatty alcohol (ether) sulfates, $C_{13}$–$C_{15}$ alcohols which have been alkoxylated with 11 to 20 molecules of ethylene oxide, and fatty acid amides.

6. The compositions as claimed in claim 1, wherein component f) is selected from the group consisting of sodium nitrate, the potassium salt of sebacic acid, the sodium salt of sebacic acid, benzotriazole, and tolutriazole.

7. The compositions as claimed in claim 1, comprising of 0.1 to 1.5% by weight of component d).

8. The compositions as claimed in claim 1, comprising of 0.05 to 1.0% by weight of component e).

* * * * *